(12) United States Patent
Bugenhagen

(10) Patent No.: US 7,890,111 B2
(45) Date of Patent: Feb. 15, 2011

(54) SYSTEM AND METHOD FOR VIRTUAL WIRELESS ROAMING

(75) Inventor: Michael K. Bugenhagen, Olathe, KS (US)

(73) Assignee: Embarq Holdings Company, LLC, Overland Park, KS (US)

( * ) Notice: Subject to any disclaimer, the term of this patent is extended or adjusted under 35 U.S.C. 154(b) by 1012 days.

(21) Appl. No.: 11/644,338

(22) Filed: Dec. 22, 2006

(65) Prior Publication Data

US 2008/0152118 A1 Jun. 26, 2008

(51) Int. Cl.
*H04W 40/00* (2009.01)

(52) U.S. Cl. .................... 455/445; 455/417; 455/422.1; 455/432.1; 455/432.3; 455/435.1; 455/435.2; 379/211.02; 379/221.01; 379/201.06

(58) Field of Classification Search ................. 455/445, 455/417, 406, 422.1; 379/211.02, 221.01, 379/201.06
See application file for complete search history.

(56) References Cited

U.S. PATENT DOCUMENTS

| | | | | |
|---|---|---|---|---|
| 5,873,031 A | * | 2/1999 | Griffith et al. | 455/432.1 |
| 5,966,653 A | * | 10/1999 | Joensuu et al. | 455/445 |
| 6,011,975 A | * | 1/2000 | Emery et al. | 455/456.1 |
| 6,014,377 A | * | 1/2000 | Gillespie | 370/351 |
| 6,026,295 A | * | 2/2000 | Okada | 455/416 |
| 6,044,267 A | * | 3/2000 | Foladare et al. | 455/426.1 |
| 6,330,448 B1 | * | 12/2001 | Otsuka et al. | 455/436 |
| 6,584,316 B1 | * | 6/2003 | Akhteruzzaman et al. | 455/445 |
| 6,628,947 B1 | * | 9/2003 | Yu et al. | 455/435.1 |
| 6,950,650 B2 | * | 9/2005 | Roeder | 455/417 |
| 2003/0003900 A1 | * | 1/2003 | Goss et al. | 455/417 |
| 2004/0101124 A1 | * | 5/2004 | Koch et al. | 379/220.01 |

* cited by examiner

*Primary Examiner*—Rafael Pérez-Gutiérrez
*Assistant Examiner*—Lameka J Kirk
(74) *Attorney, Agent, or Firm*—SNR Denton US LLP

(57) ABSTRACT

A system and method is provided for call routing from a wired telephone switch. A wireless device is registered with a database of the wired telephone switch. Incoming wireless calls destined for the wireless device are routed to a standard telephone. The wireless device is unregistered to disable the call routing to the standard telephone.

19 Claims, 5 Drawing Sheets

SYSTEM AND METHOD FOR VIRTUAL WIRELESS ROAMING

BACKGROUND

Wireless communications has grown nearly exponentially in recent years. The growth is fueled by larger networks with more reliable protocols and better communications hardware available to service providers and consumers. The increasing demand for wireless communications requires enhanced operability between wireless and wired networks. In many cases, telephony switches are limited by standards, such as Third Generation Partnership Project 2 (3GPP2). The 3GPP2 provides a third generation mobile system that allows, for example, a single switch to implement information management system behavior over both wireless and wired packet environments. The limitations of the standards prevent all features of both wired and wireless networks to be fully integrated and accessible through legacy wired telephone switches.

Despite improving wireless technology, wireless-to-wireless calls are still plagued by poor quality of service (QoS). Additionally, many wireless service providers lack coverage in rural areas because of the large geographic areas that must be covered and the expense of making coverage to a limited population. Quality of service is a generic term for measuring and maintaining the quality of a network including particularly latency and voice quality for wireless communications. Many users notice quality of service problems when phone calls are dropped, delayed, or otherwise scrambled or made unrecognizable. Quality of service is not a significant problem for traditional wired phone service providers. Unfortunately, the switches and devices used by wired and wireless networks are not well integrated for providing both the quality of service provided by wired networks with the convenience of wireless networks.

SUMMARY

One embodiment includes a for call routing from a wired telephone switch. A wireless device may be registered with a database of the wired telephone switch. Incoming wireless calls destined for the wireless device may be routed to a standard telephone. The wireless device may be unregistered to disable the call routing to the standard telephone.

Another embodiment includes a mobile switching center for routing calls from a wireless device to a standard telephone. The mobile switching center includes a home location register for managing routing information about multiple devices and routing calls and data to the wireless device. The mobile switching center also includes a virtual location register for storing a temporary locator number for the wireless device, the temporary locator number being operatively associated with a standard telephone for routing incoming calls destined for the wireless device to the standard telephone.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

The illustrative embodiments of the present invention provide a method, system, and apparatus for routing calls destined for a wireless device to a standard telephone. A wireless user may provide input using a wireless device so that phone calls to the wireless user are routed to a standard or plain old telephone service (POTS) phone. The standard telephone is a wireline telephone using analog or voice over Internet Protocol (VoIP) protocols. The wireless device is registered as roaming to the mobile switch network using the phone number of the standard telephone. Alternatively, the wireless device is temporarily assigned a temporary locator number (TLN) so that incoming calls are routed to the applicable class 5 switch for receiving the phone calls. The class 5 switch routes incoming phone calls to the standard telephone based on the registration information sent to the wireless or mobile network, such as the wireless phone number, mobile service identifier (MSID), and the phone number of the standard telephone.

Figure 1:
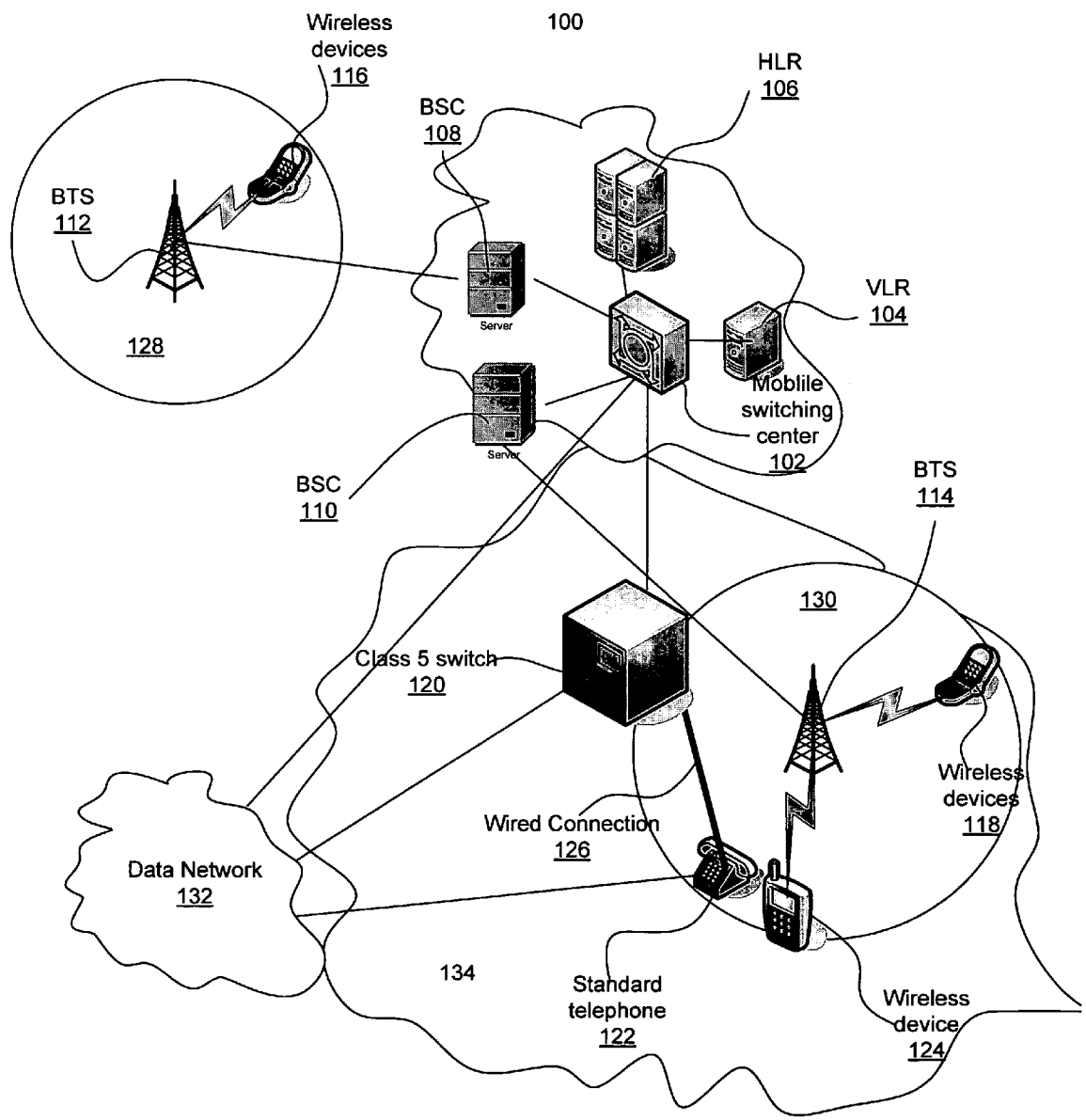
FIG. 1 is a block diagram of a communications system in accordance with the illustrative embodiments of the present invention.

FIG. 1 is a block diagram of a communications system in accordance with the illustrative embodiments of the present invention. The communication system 100 of FIG. 1 includes numerous devices and elements including a mobile switching center 102, a virtual location register (VLR) 104, a home location register (HLR) 106, base station controllers (BSC) 108, 110, base transceiver stations (BTS) 112, 114, wireless devices 116, 118, a class 5 switch 120, a standard telephone 122, and a wireless device 124. A class 5 switch 120 shall mean a switch using technology to provide telecommunications services. For example, the class 5 switch 120 may be a wireline switch or exchange using time domain multiplexing to provide telecommunications services to a particular subscriber or groups of subscribers. The class 5 switch 120 may be located at a local telephone company's central office, or at a business location serving as a private branch exchange. The class 5 switch 120 may provide dial-tone, calling features, and additional digital and data services to subscribers. The class 5 switch 120 may be connected to the standard telephone 124 by a wired connection 126. Communications within the communication system 100 may occur on any number of networks which may include wireless networks 128, 130, a data network 132, and a publicly switched network 134.

The mobile switching center (MSC) 102 may be a switch used for wireless call control and processing. The MSC 102 also serves as a point-of-access to the publicly switched network 134 through the class 5 switch 120. The MSC 102 is a sophisticated telephone exchange which provides circuit-switched calling, mobility management, and global system for mobile communications (GSM) or personal communications system (PCS) services to the mobile phone located within the area the MSC 102 serves. Roaming is a term in wireless telecommunications that refers to the extending of connectivity service in a location that is different from the home location where the service was registered. Roaming may occur when a subscriber of one wireless service provider uses the facilities of another wireless service provider. For example, assuming the MSC 102 is the home switch of the wireless devices 116, 118 and 124, the MSC 102 functions as a gateway that determines the location of wireless devices 116, 118, 124 or information required to make calls to the wireless devices 116, 118 and 124.

The HLR 106 is a central database connected to the MSC 102 that contains details of each wireless device subscriber that is authorized to use the wireless network 128. The HLR 106 applies to all types of wireless networks, such as CDMA, TDMA and GSM. The HLR 106 stores data associated with a wireless device including subscriber identity module (SIM) information and telephone numbers often referred to as a mobile systems international subscriber identity number (MSISDN). The MSISDN is a number used for making and receiving voice calls and a primary key to the records on the HLR 106. The SIM is a smart card containing the telephone number of the subscriber, encoded network identification details, and other user data. The HLR 106 manages location updates of wireless devices as the devices roam around different networks and may be integrated with the MSC 102 or a separate component.

The VLR 104 is a temporary database connected to the MSC 102 that holds information and temporary locator numbers (TLNs) of the subscribers who have roamed into the particular area which the MSC 102 serves. The VLR 104 maintains temporary user information, registers the user's location to the home network HLR 106, and provides temporary locator numbers for each roaming wireless device. The MSC 102 and VLR 104 manage requests from subscribers who are out of the area covered by their home mobile switching center. When a device travels outside of it's home wireless footprint to a separate network, the MSC 102 recognizes the device as roaming if the home network and the separate network have roaming agreements. Once recognized the VLR 104 issues the wireless device 124 a TLN and sends the information to the HLR 104 so the location of the wireless device 124 is registered. This does not require the user to take any action as long as the wireless device 124 is turned on.

The VLR 104 may purge the subscriber record if the subscriber becomes inactive while in the area of the VLR 104. For example, the VLR 104 deletes the subscriber's data after a fixed time period of inactivity and informs the HLR 106 when the phone has been switched off and left off or when the subscriber has moved to an area with no coverage for an extended time period. The VLR 104 also deletes the temporary subscriber record or TLN as instructed by the HLR 106 when a subscriber explicitly moves to another wired network. The data stored in the VLR 104 has either been received from the HLR 106, or collected from the MSC 102. In other embodiments, the MSC 102, HLR 106, and VLR 104 may be integrated into a single device.

The base station controllers (BSC) 108 and 110 are components of the communication system 100 that coordinates multiple base transceiver stations (BTS) and communicates with the MSC 102 to place individual wireless calls. Additionally, the BSCs 108, 110 and MSC 102 register wireless devices in the cell, assign control and traffic channels, perform handoff and process call setup and termination. The base transceiver stations (BTS) 112 and 114 transmit and receive data directly from wireless devices of the wireless networks 128 and 130. Typically, there is one BTS per MSC 102 site and the BTS includes aerials to supply a radio cell. For example, BTS 112 broadcasts the wireless network 128 and BTS 114 broadcasts the wireless network 130.

The features of the present invention are implemented by the class 5 switch 120. The class 5 switch 120 is a wired telephone switch or exchange interconnected with the MSC 102. In many cases, the class 5 switch 120 is located within or in close proximity to the central office of a local telephone company. The class 5 switch 120 provides basic dial tone, calling features and additional analog, digital, and data services to the subscribers of the publicly switched network 134. In this example, the class 5 switch 120 provides dial tone and service to the standard telephone 124. The class 5 switch 120 may also enable voice over Internet protocol (VoIP) communication of the standard telephone 124 through the data network 132. VoIP works through sending voice information in digital form in packets, rather than in the traditional circuit-committed protocols of the publicly switched network 134.

The class 5 switch 120 includes various elements and modules that allow the class 5 switch 120 to emulate a mobile switching center, such as mobile switching center 102. Particularly, the class 5 switch 120 may include a mobile carrier code, a VLR database, a new line record, an address table, and a routing trigger. The SS7 protocol functions may be used to handle roaming control signals to one or more HLR 106. Each element of the class 5 switch functions together to allow call and data routing from the wireless device to the standard telephone 124, the publicly switched network 134 and the wireless service provider operating the MSC 102. In one embodiment, the wireless roaming elements and components are integrated with the class 5 switch 120. In another embodiment, the VLR database, the mobile carrier code, the new line record, and the address table may be part of external components communicating with the class 5 switch 120 using a signal control protocol or application program interface (API). For example, all of the class 5 switch 120 components used for roaming may be part of an external VLR or other advanced intelligent network (AIN) device.

In one embodiment, a user may order or otherwise request the routing service using a routing command. The command may be implemented by a user action during dialing. Specific user feedback, such as a specific dial tone signal or other message, may signal to the user that roaming is active from the class 5 switch. The user may specify the phone number or phone numbers to which calls from the wireless device 124 are to be routed. In one embodiment, the user may specify two phone numbers that are used as (TLN) by the VLR database of the class 5 switch 120. The TLN may be pre-loaded, automatically configured, or manually entered in order to route calls destined for the wireless device to the desired number and corresponding phone.

A user may use the wireless device 124 for mobile communications by accessing numerous compatible wireless networks. At any time, the user may select to have calls destined for the wireless device 124 routed to the standard telephone 124. The wireless user may enable the routing in a number of ways. The wireless user may use a routing command to enable the call routing. The routing command is a signal generated to activate the routing trigger of the class 5 switch 120 for call routing from the wireless device 124. In one example, the user may submit a routing command by dialing *79. The routing command may also be a password, voice activated, time activated, and preset by the user.

The class 5 switch 120 and MSC 102 communicate using a signal control protocol, such as a signaling system number 7 (SS7) protocol. The SS7 protocol is used in publicly switched networks to establish connections between switches, performing out-of-band signaling in support of the call-establishment, billing, routing, and information-exchange functions of the publicly switched network 134. The VLR database of the class 5 switch 120 passes the registration information to the mobile switching center 102 and the VLR 104. As a result, the wireless device 124 is assigned a temporary locator number (TLN) that directs all calls to the standard telephone 122 instead of the wireless device 124. This TLN is sent to the HLR 106 to indicate location and provide contact information.

By providing user input, the user effectively registers the wireless device 124 with the class 5 switch 120 for the purpose of rerouting phone calls to the standard telephone 122. The HLR 106 functions normally and forwards all incoming calls to the TLN provided by the class 5 switch 120. Once the TLN is established in the wireless network HLR 106, the TLN stays active until the HLR 106 receives a new TLN from another switch or the class 5 switch 120 un-registers the TLN. This can occur by the mobile user moving into the control of another BSC or MSC or by turning the wireless device 124 on after is has been off. Either of the described actions will cause the MSC 102 hosting the wireless device 124 to be re-registered with the HLR 106 thereby breaking the TLN registration of the class 5 switch 120. The user may submit the routing command because wireless device 124 has poor wireless access or prefers to receive incoming calls on the standard phone 122 for purposes of comfort or convenience. For example, the user may prefer the comfort and battery life of the standard telephone 122 when available. In current solutions, the mobile switching center 102 is unable to take a roaming request from a landline switch such as the class 5 switch 120.

Separate agreements between the wireless user, the owner of the class 5 switch 120, and the mobile switching center 102 may be required to allow the call routing herein described. For example, the wireless service provider that owns the MSC 102 may need to have an agreement or contract in place with a local telephone company that owns the class 5 switch 120 for allowing the calls destined for the wireless device 124 to be routed from the mobile switching center 102 through the class 5 switch for termination at the standard telephone 122. The two parties may be required to establish a service fee, fee arrangement, fee sharing, or other terms of compensation, collaboration, or mutual understanding. For example, the local telephone company may require that 1.5 cents per minute be paid in compensation for calls originally destined for the wireless device 124 that are routed through the class 5 switch 120 to the standard telephone 122.

The wireless user may unregister or deregister the call routing in any number of ways. For example, the call routing may be automatically disabled when making a phone call from the wireless device. Alternatively, the wireless user may use the standard telephone 122 and the wireless device 124 to enter a deactivation trigger such as *79. In another embodiment, the wireless user may travel with the wireless device 124 into a separate wireless network such as wireless network 116. At that point, the call routing is automatically disabled by the class 5 switch 120 when the wireless device 124 is registered with a new VLR. The illustrative embodiments of the present invention are particularly useful for wireless service providers that may not have complete coverage in rural areas or other areas that are hard to cover such as mountainous regions. As a result, when at home, the wireless user may trigger the call routing so that all incoming phone calls are routed to the standard telephone 122 for convenience. In many cases, the standard telephone 122 has a better battery life and the handset is more durable and functional for receiving numerous calls.

Figure 2:
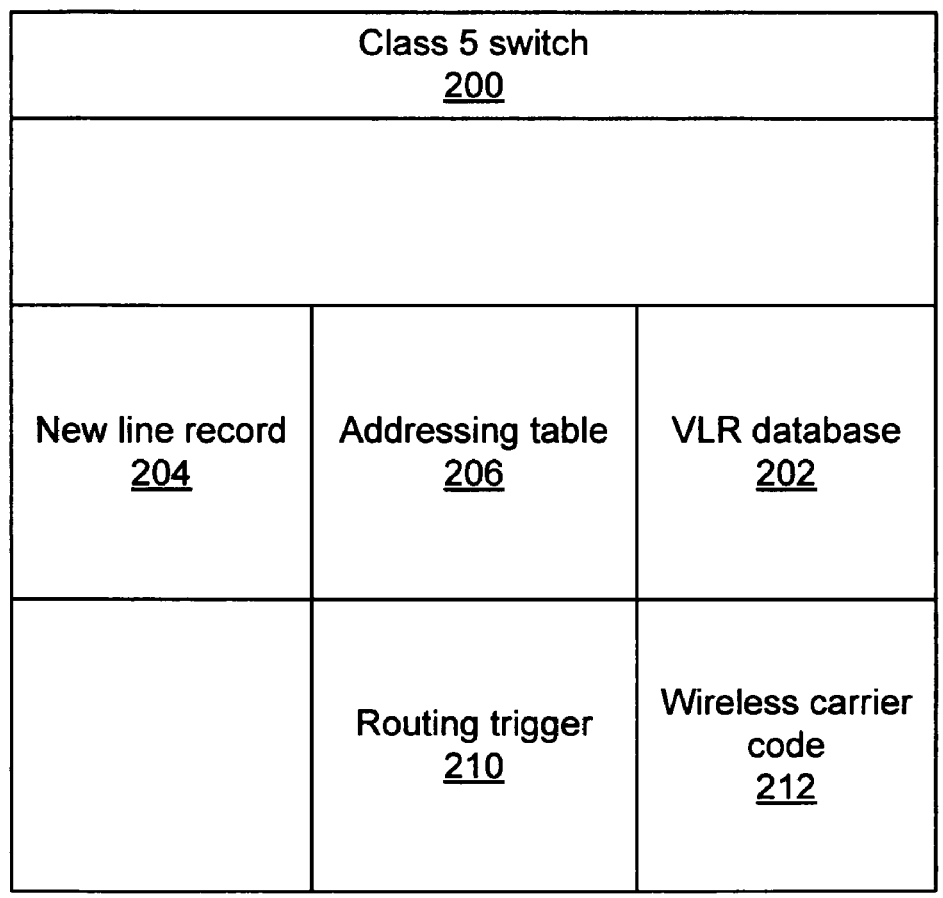
FIG. 2 is a block diagram of a class 5 switch in accordance with the illustrative embodiments of the present invention.

FIG. 2 is a block diagram of a class 5 switch in accordance with the illustrative embodiments of the present invention. The class 5 switch 200 is a particular implementation of the class 5 switch 120 of FIG. 1. The class 5 switch 200 includes numerous hardware and software elements used by standard telephone switches that are not described herein. Additionally, the class 5 switch 200 includes software modules for implementing aspects of the present invention. In one embodiment, the modules of the class 5 switch 200 include a VLR database 202, a new line record 204, an addressing table 206 and a call trigger 210. The database elements of the class 5 switch 200 may be multiple databases, registries or records or may be integrated into a single database internally or externally accessible by the class 5 switch.

In another embodiment, the modules may be part of an external VLR or artificial intelligence network (AIN) device in communication with the class 5 switch 200. The external AIN device may receive commands from the class 5 switch 200 and pass messages and instructions back to the class 5 switch 200 for performing the actions and features described for each component. In one example, the class 5 switch 200 and the external device may not be owned or operated by the same group, but rather may communicate to accomplish the method and features herein described.

The new line record 204 stores wireless device numbers and SIM information associated with wireless devices that tells the class 5 switch 200 whether a wireless device may roam to the class 5 switch 200. The new line record 204 may be a database that is updated based on service provider and consumer agreements as previously described. For example, a wireless service provider, MBugwireless, may sign an agreement with the owner of the class 5 switch 200 so that any customer of MBugwireless may access the class 5 switch 200 for call routing to a standard telephone.

The addressing table 206 may be a table for control signal addressing for the home locator record (HLR) associated with each wireless carrier. The addressing table 206 stores information for updating the location registration of wireless devices that may roam to the class 5 switch 200 using signals, such as SS7. The information stored in the addressing table 206 may be used by the VLR database 202. For example, the addressing table 206 may store the cell number of the wireless device, a number of the home or standard telephone, the MSISDN, a subscriber name, a mobile service identifier, and an identification number. The entire set of information may be stored so that a call trigger such as *79 may be used to execute the roaming function. Alternatively, the addressing table 206 may store a portion of the required information so that once the user enters information, such as the wireless phone number, the roaming feature may be executed. Automated features may also be added which may include time of day roaming. For example, the user may set up automated routing so that at 7 p.m. when free minutes are available through the wireless plan, all calls destined for the wireless device are automatically routed to the standard telephone.

The VLR database 202 may be a database of all mobile numbers and wireless devices currently being supported by the class 5 switch 200. The VLR database 202 emulates a VLR of a mobile switching center (MSC). The VLR database 202 is a database that informs the home mobile switching center of the wireless device. More particularly, the VLR database sends update information to the home locator record (HLR) indicating a subscriber is roaming to the class 5 switch 200 so that incoming calls may be routed to the standard phone. The VLR database 202 receives subscriber data from the HLR for allowing incoming calls and text messages to be delivered to the standard telephone, such as standard telephone 122 of FIG. 1. The VLR database 202 registers the phone number of the standard telephone as the (TLN) so that phone calls intended for the wireless device as routed to the TLN which dials the standard telephone. As a result, the user is able to receive all of the wireless calls even though the wireless device is turned off or away from wireless service.

The routing trigger 210 may be a module that responds to a routing command from a user that enables call routing from the wireless device to the standard telephone. For example, once a user enters a code such as *79, the class 5 switch 200 may request that the VLR database 202 register with the MSC and HLR of the home network for routing all calls and data through the class 5 switch 200 to the standard telephone instead of the wireless device. In effect, the routing trigger 210 tells the HLR of the wireless carrier to route all incoming calls and data destined for the wireless device to the class 5 switch 200 for delivery.

Wireless carrier code 212 is a SS7 type identifier the class 5 switch 200s uses to send and receive VLR and HLR control signals. The wireless carrier code 212 identifies the specific class 5 switch where the wireless account is roaming to. The wireless carrier code 212 may be required for authentication purposes with the wireless carrier or MSC when routing trigger 210 initiates the roaming process in response to receiving the routing command.

Figure 3:
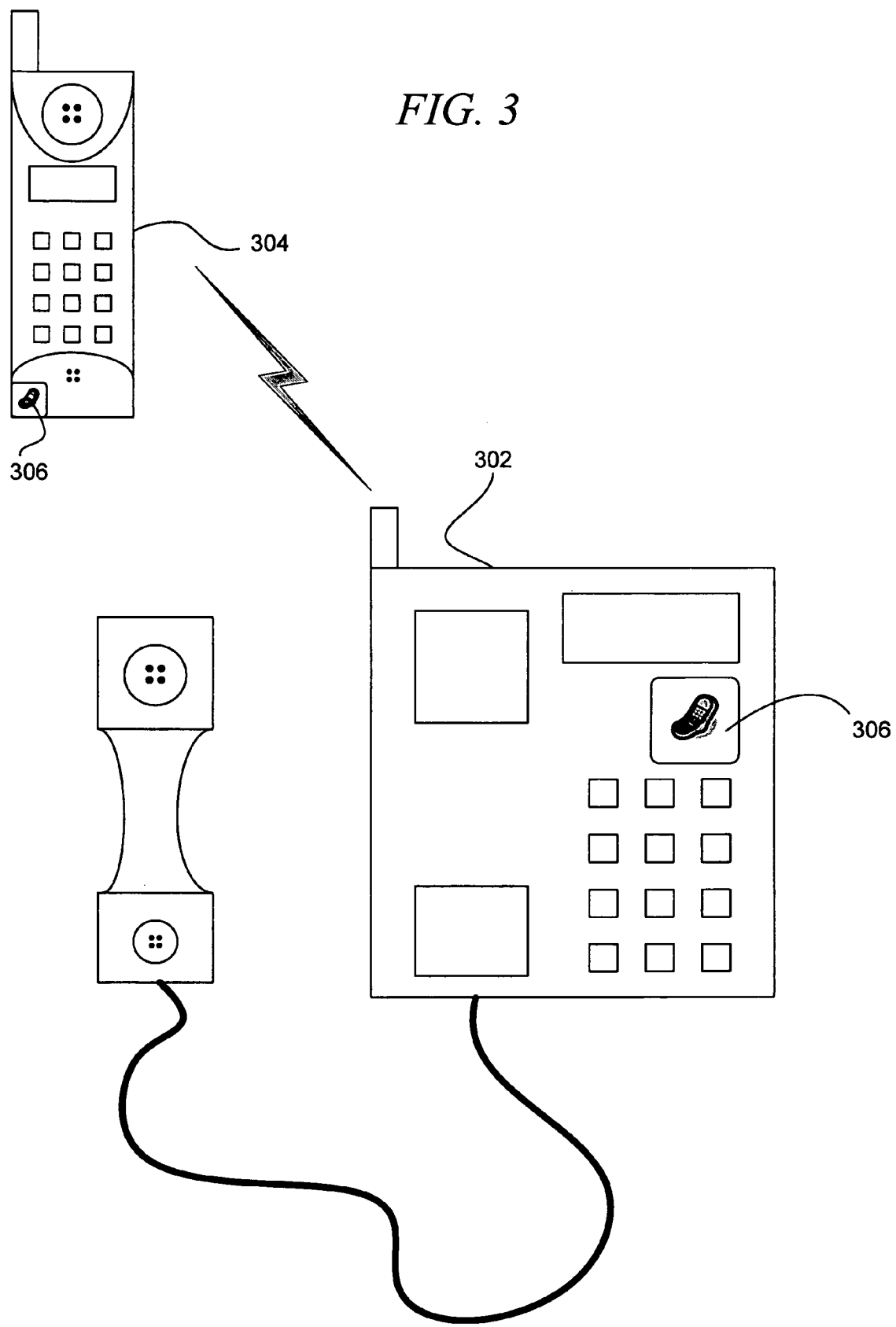
FIG. 3 shows examples of communications devices in accordance with the illustrative embodiments of the present invention.

FIG. 3 shows examples of communications devices in accordance with the illustrative embodiments of the present invention. FIG. 3 includes a standard telephone 302 and a cordless telephone 304. The standard telephone 302 and the cordless telephone 304 may include a routing button 306. The routing button may be an interface that allows the user to send a signal or routing command to a class 5 switch for activating call routing from a wireless device to the standard telephone 302. For example, the routing button 306 may be a graphical user interface, touch screen, voice command, scroll wheel, or other input device that generates the command signal for transmission to the class 5 switch when pressed, selected, or otherwise activated. The standard telephone 302 and cordless telephone 304 are particular implementations of the standard telephone 122 of FIG. 1.

The standard telephone 302 and cordless telephone 304 are telephones that operate in conjunction with a publicly switched network and class 5 switch. In another embodiment, the communication service accessible from the standard telephone 302 and the cordless telephone 304 may be part of a voice over Internet protocol (VoIP) telephone service. The standard telephone 302 and cordless telephone 304 are provided dial tone though a wired connection to a home, business or other location in which the standard telephone 302 and cordless telephone 304 are located.

Figure 4:
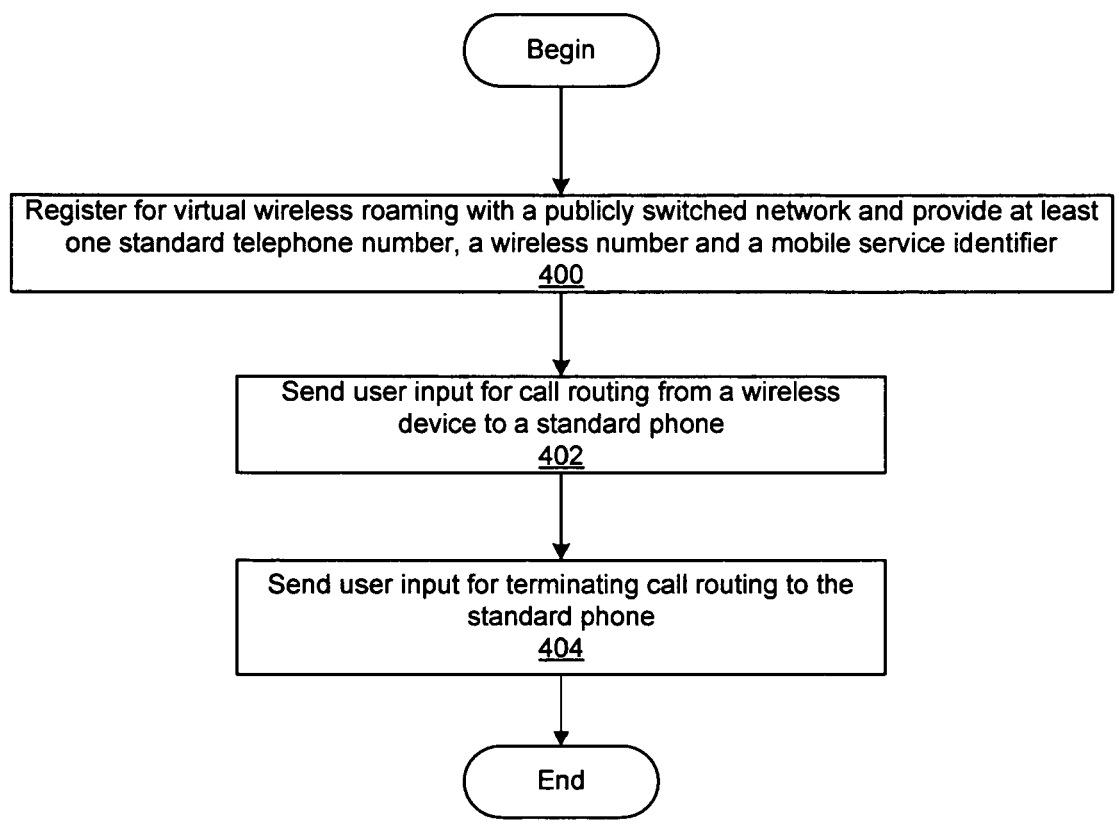
FIG. 4 is a flowchart of a process for communication using a wireless device in accordance with the illustrative embodiments of the present invention.

FIG. 4 is a flowchart of a process for communication using a wireless device in accordance with the illustrative embodiments of the present invention. The process of FIG. 4 may be implemented by a wireless device or standard telephone. The process begins by registering for virtual wireless roaming with a publicly switched network and providing at least one standard telephone number, a wireless number and a mobile service identifier (step 400). In one embodiment, step 400 may be performed when a user signs up for standard or VoIP telephone service or for wireless service. Step 400 may also be performed as an additional service request available through the local phone or wireless provider. The standard telephone number is the temporary locator number that is used by the virtual location register (VLR) database of the class 5 switch to register with the home locator switch of the user's home mobile switching center.

Next, the wireless device sends user input for call routing (step 402). The user input may be a routing command received using a graphical user interface, touch screen, button, knobs, scroll, wheel or other interfaces or mechanisms of the standard telephone. User access and input for registering and unregistering the wireless device may be provided via interfaces, such as voice command portals, interactive voice response (IVR), web based and mobile web portal based user control systems, wireless (short message service) SMS interfaces, and other wire line and wireless control interfaces. The user input may also be sent by entering a set dialed command, through a website interface, a text message, based on preset times or preferences, or by dialing a 1-800 number, or sending a message, code, or password from a device. The user input is sent in step 402 so that a class 5 switch registers the wireless device as roaming through the class 5 switch so that all incoming calls destined for the wireless device are routed through a hard wired telephone switch to a standard telephone. In one embodiment, the user selects to have calls to the wireless device routed to the standard telephone by pressing "*79." In another embodiment, the user selects to have calls to the wireless device routed by pressing a routing button on a standard phone. During the time the wireless device is routed to the class 5 switch, the switch may play a modified dial tone and/or provide some other audible or visual signal that the routing condition exists.

Next, the wireless device sends user input for terminating call routing to the standard telephone (step 404) with the process terminating thereafter. The user input may be received by the user dialing *79 using the standard telephone, activating the wireless device, or traveling into a new BSC or cellular site mandating a VLR update which would update the HLR for the wireless carrier.

Figure 5:
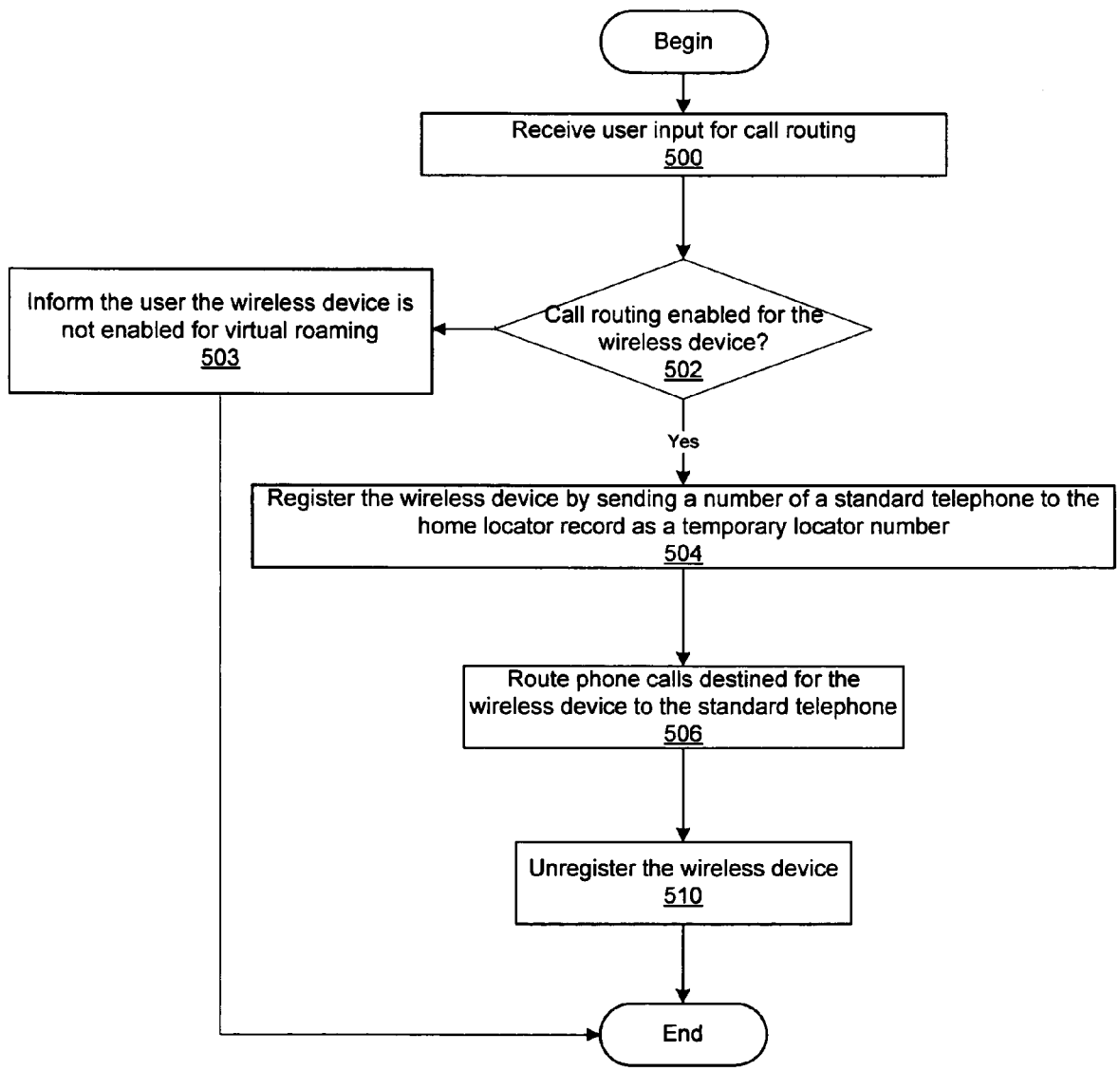
FIG. 5 is a flowchart of a process for communication using a class 5 switch in accordance with the illustrative embodiments of the present invention.

FIG. 5 is a flowchart of a process for communication using a class 5 switch in accordance with the illustrative embodiments of the present invention. The process of FIG. 5 may be implemented by a communication system and particularly by a class 5 switch with enhanced virtual location registry functionality. The process of FIG. 5 begins by first receiving user input for all routing (Step 500). The user input may be received or entered by a wireless user. For example, the user may enter *79 or press a routing button on a standard telephone.

Next, the class 5 switch determines whether call routing is enabled for the wireless device (step 502). The call routing is enabled if there is an agreement between the wireless service provider and the publicly switched network to allow virtual roaming on the publicly switched network. The class 5 switch may use a database, registry, or new line record to determine if the wireless device is registered for virtual roaming to a standard telephone number. If the class 5 switch is not enabled for the wireless device, the class 5 switch informs the user the wireless device is not enabled for virtual roaming (step 503). The user may be notified by an error message, text message, or other indicator. In another embodiment, nothing happens indicating the wireless device is not enabled for call routing.

Next, the class 5 switch registers a wireless device by sending a number of a standard telephone to the home locator record (HLR) as a temporary locator number (TLN) (step 504). The standard telephone may be a VoIP phone or a phone enabled through a phone network. The wireless device may be registered by storing a phone number of the standard phone in a virtual location registry (VLR) database of the class 5 switch as a temporary locator number (TLN) and sending the TLN to the mobile switching center, HLR, or VLR Next, the class 5 switch routes phone calls destined for the wireless device to the standard telephone (step 506). In step 506, calls, text messages, and other data destined for the wireless device are automatically forwarded to the class 5 switch because the HLR of the mobile switching center has the standard telephone number listed as a TLN. From the class 5 switch the TLN is used to forward the call to the standard telephone.

Next, the class 5 switch unregisters the wireless device (step 510) with the process terminating thereafter. Step 510 may be initiated in response to receiving user input to disable the routing embedded in step 502. For example, the user may turn on the wireless device to end the call routing. If the device is already on, the user may connect to a new BSC/MSC during travel which forces a roaming update. Alternatively, the user may manually select to end the routing by entering a code, message, password, or identifier, such as pressing *79.

The illustrative embodiments of the present invention provide a system and method for a wireless phone to roam from a class 5 switch. A wireless device is registered with a database of the wired telephone switch. The wired telephone switch signals the owning wireless network signaling control plane that the mobile device is "roaming" and the temporary location of the wireless device is the wired phone number. Incoming wireless calls destined for the wireless device are routed to a standard telephone. The wireless device is unregistered to disable the call routing to the standard telephone. In many cases, the quality of service is improved because phone calls are sent through a wired connection rather than wirelessly.

The previous detailed description is of a small number of embodiments for implementing the invention and is not intended to be limiting in scope. One of sill in this art will immediately envision the methods and variations used to implement this invention in other areas than those described in detail. The following claims set forth a number of the embodiments of the invention disclosed with greater particularity.

What is claimed:

1. A method for call routing from a wired telephone switch, said method comprising:
    receiving, at a switch of a wireless service provider, a request to register a wireless device for call routing to a standard telephone of a wired network of a wired network provider;
    determining, by the switch, whether the wireless service provider has an agreement with the wired network provider for enabling virtual roaming on the wired network;
    responsive to a determination that the wireless service provider has the agreement with the wired network provider for enabling virtual roaming on the wired network, registering the wireless device with a database of the wired telephone switch and routing incoming wireless calls destined for the wireless device to the standard telephone;
    unregistering the wireless device to disable the call routing to the standard telephone; and
    responsive to a determination that the wireless service provider does not have the agreement with the wired network provider for enabling virtual roaming on the wired network, transmitting, by the switch, a message to the wireless device to notify a user of the wireless device that the wireless device is not enabled for virtual roaming.

2. The method according to claim 1, wherein the wired telephone switch is a class 5 switch used in a publicly switched network.

3. The method according to claim 1, wherein the registering step is performed in response to receiving a user input.

4. The method according to claim 1, wherein the unregistering step further comprises:
    receiving user input to terminate the call routing; and
    terminating the call routing to the standard telephone.

5. The method according to claim 4, wherein the user input comprises dialing a phone number on the wireless device, turning on the wireless device, entering an identifier, or using the cell phone in a different wireless network.

6. The method according to claim 1, wherein the registering step further comprises:
    updating a home locator record and a home mobile switching center of the wireless device with a number of the wireless device, a mobile service identifier and a temporary locator number that links to the standard telephone.

7. The method according to claim 1, wherein registering the wireless device further comprises:
    sending a home locator record a wireless phone number, a mobile service
    identifier, and a phone number of a standard telephone.

8. A mobile switching center system for routing calls from a wireless device to a standard telephone, said mobile switching center system comprising:
    a memory for storing executable instructions;
    a processor for executing the executable instructions for performing the steps of determining whether a wireless service provider associated with the wireless device has an agreement with a wired network provider associated with the standard telephone for enabling virtual roaming on a wired network of the wired network provider and in response to a determination that the wireless service provider does not have the agreement with the wired network provider for enabling virtual roaming on the wired network transmitting a message to the wireless device to notify a user of the wireless device that the wireless device is not enabled for virtual roaming;
    a home location register for managing routing information about a plurality of devices and routing calls and data to the wireless device; and
    a virtual location register for storing a temporary locator number for the wireless device, the temporary locator number being operatively associated with the standard telephone for routing incoming calls destined for the wireless device to the standard telephone, wherein the temporary locator number for the wireless device is inserted in the virtual location register in response a determination that the wireless service provider associated with the wireless device has an agreement with the wired network provider associated with the standard telephone.

9. The mobile switching center according to claim 8, wherein the virtual locator register receives the temporary locator number from a database associated with a class 5 switch.

10. The mobile switching center according to claim 9, wherein an agreement between an wireless service provider operating the mobile switching center and a telephone provider operating the class 5 switch allows the incoming calls to be routed through the class 5 switch to the standard telephone.

11. The mobile switching center according to claim 9, wherein the agreement allocates a portion of the fees collected for the incoming calls to an owner of the class 5 switch.

12. The mobile switching center according to claim 8, wherein the home locator record registers the wireless device as roaming with the class 5 switch in response to receiving the temporary locator number.

13. A wired telephone switch comprising:
- a processor for executing instructions within software modules;
- a memory operatively connected to the processor for storing the software modules including: a record indicating a plurality of wireless devices that may roam to the wired telephone switch, the plurality of wireless devices associated with one or more wireless service providers determined to have an agreement with a wired network provider operating the wired telephone switch for enabling virtual roaming on a wired network of the wired network provider;
- the processor operative to execute instructions to transmit a message to the wireless device to notify a user of the wireless device that the wireless device is not enabled for virtual roaming in response to a determination that the wireless service provider does not have the agreement with the wired network provider for enabling virtual roaming on the wired network;
- a routing trigger operative to register a wireless device as roaming with the wired telephone switch operative to route incoming calls destined for the wireless device to a standard telephone; and
- a database operative to store a temporary locator number associated with the standard telephone for routing the incoming calls through the wired telephone switch.

14. The wired telephone switch according to claim 13, wherein the wired telephone switch is a class 5 switch or an voice over Internet protocol server.

15. The wired telephone switch according to claim 14, wherein the software modules are part of an externally linked artificial intelligence network device or a virtual locator record in communication with the wired telephone switch.

16. The wired telephone switch according to claim 13, wherein the software modules further comprise:
- an addressing table for storing a cell phone number, a mobile service identifier, and a phone number of a standard telephone for updating a home location register of a mobile switching center in communication with the wired telephone switch.

17. The wired telephone switch according to claim 13, wherein the temporary locator number is the phone number of the standard telephone.

18. The wired telephone switch according to claim 13, wherein the routing trigger registers the wireless device in response to receiving a routing command from a user.

19. The wired telephone switch according to claim 13, wherein the routing trigger unregisters the wireless device based on any of a user making a call on the wireless device, entering a different wireless network, and entering a code.

* * * * *